United States Patent [19]

Drzevitzky et al.

[11] Patent Number: 4,529,103

[45] Date of Patent: Jul. 16, 1985

[54] DISPENSER OF COATING MATERIAL WITH ADJUSTABLE OUTLET

[76] Inventors: Bernd Drzevitzky, Asternweg 126, D-5024 Pulheim; Wolfgang Breynk, Erftstrasse 14, D-5000 Koln 50, both of Fed. Rep. of Germany

[21] Appl. No.: 516,112

[22] Filed: Jul. 22, 1983

[30] Foreign Application Priority Data

Aug. 21, 1982 [DE] Fed. Rep. of Germany ... 8223604[U]

[51] Int. Cl.³ .......................... B67D 5/60; F16H 21/44

[52] U.S. Cl. ................................ 222/130; 222/146.2; 222/506; 222/553; 118/410; 74/110

[58] Field of Search ......................... 118/410, 411, 24; 222/505, 506, 545, 553, 130, 146.2; 74/110, 89.15, 89.14; 251/209; 425/90, 94, 101, 104

[56] References Cited

U.S. PATENT DOCUMENTS 3,419,934 1/1969 Lovett ................................ 118/410
3,479,989 11/1969 Hunter et al. ....................... 118/410
3,702,098 11/1972 Eburn, Jr. ............................ 74/110
4,018,367 4/1977 Morine et al. ...................... 222/545
4,449,416 5/1984 Huitema ............................ 74/89.14

FOREIGN PATENT DOCUMENTS 2432122 3/1980 France ............................... 251/209

*Primary Examiner*—Joseph J. Rolla
*Assistant Examiner*—Andrew Jones
*Attorney, Agent, or Firm*—Bucknam and Archer

[57] ABSTRACT

To coat a material web of sheet, paper or another carrier material, a flowable coating material is conducted into a distributing chamber consisting of the inner space of a rotatable tube. The coating material is supplied to a wedge-shaped recess whose effective width may be adjusted by turning the tube, via a slot formed through the wall of the tube. The recess is joined in the housing block by a gap ending in an adjustable doctor gap along which the carrier material is moved. The dosing device permits a very accurate determination of the applied thickness of the coating material by fine adjustment.

5 Claims, 4 Drawing Figures

DISPENSER OF COATING MATERIAL WITH ADJUSTABLE OUTLET

The invention relates to a dosing device for applying to a support a flowable coating material, comprising an elongated distribution chamber having a slit outlet and a slit doctor die of two parallel lips arranged behind the outlet in flow direction.

It has been known to coat webs of sheet, paper or of another support material with hot-melting materials by using a slit doctor die. The coating materials that have been used are, for instance, hot-melt adhesives, thermoplastic products, bitumen or the like. When the supports had been coated, it became most difficult to treat and dose the hot-melting coating materials which mostly were applied in a viscous condition, whereby extremely high shearing forces can be developed in particular in the doctor gap of the slit doctor die, which mainly act on the lip situated downstream of the support material in the direction of travel. Due to the high shearing forces and to the other coating conditions, an accurate dosing of the amount of coating material is very difficult. In the known dosing devices, the dosed amount is changed by adjusting the width of the doctor gap between the parallel lips. In view of the complex pressure and flow conditions of the coating material, very little changes of the doctor gap width may result in considerable changes of the dosed amount.

It is the object of the invention to provide a dosing device of the above mentioned type which allows for rating very exactly the thickness of the coating material by fine adjustment.

To solve the problem, it is provided according to the invention that the distribution chamber is a pivoted tube having its one end adapted to a feed line, the tube periphery being enclosed nearly entirely by a housing block including a radially enlarged recess extending over part of the tube periphery and ending in the slit doctor die.

As a result, the coating material being discharged from the tube inside the distribution chamber through the slotted outlet flows into the enlarging recess. Subject to the rotary position of the tube, the width of the throttle point formed where the slotted outlet ends in the recess is changeable, so that a gap-shaped throttle element for regulating the quantity is arranged in flow direction ahead of the slit doctor die. By this means, the coating pressure and the quantity of the coating material can be varied at the slit doctor die by turning the tube. The recess constantly broadening in peripheral direction, a fine adjustment of the dosed amount will be performed with the rotation of the tube. It is to be submitted that the feed pressure for supplying the coating material of the dosing device by a pump or another pressure means is constant.

Although the tube can be adjusted as much as to cause the slotted outlet to leave the recess range of the housing block and as to be completely closed, the tube does not only serve as a valve to open and close the passage from the distribution chamber to the slit doctor die, but it additionally serves for fine adjustment and accurate dosing.

According to a preferred embodiment of the invention, at least one of the lips of the slit doctor die is fitted to be displaceable at the housing block to change the gap width of the doctor gap.

By changing the doctor gap width, the thickness of the coating material is set to be coarse, said coarse adjustment being calculated by means of known criteria. The fine adjustment is performed by turning of the tube or by changing the gap-shaped throttle point arranged ahead of the slit doctor die in flow direction.

The displaceable lip is conveniently movable from the outside with the use of a spindle system. Said movement can be performed by rotating a hand wheel or by using a servo drive. What is important is to very accurately position the displaceable lip and to exactly set the doctor gap of the slit doctor die. Therefore, the used drive system should be free of any clearance and permit an exact fine adjustment.

According to a preferred embodiment of the invention, the spindle system comprises a spindle supported by the housing block to extend in parallel to the gap and to be in engagement with at least two wedge pieces, whose surfaces are coacting with a respective wedge face of the movable lip. Thus, a correct setting free of canting is achieved with the movable lip, while it is ensured that the gap width remains uniform over the total gap length.

The wedge pieces may be mounted to be displaceable longitudinally at the movable lip of the slit doctor die in wedge-shaped recesses whose wedge angles correspond to the wedge pieces which are guiding the lip without any free play thus converting the movements of the wedge pieces along the doctor gap in both directions into direct corresponding transverse movements of the movable lip which can be advanced and returned this way accordingly.

Suitably, the spindle consists of at least two spindle sections axially aligned and firmly coupled with each other. This is favorable because for the assembly, the wedge pieces and spindle sections can be positioned independently of each other and only upon the correct respective positioning of the wedge pieces and the spindle sections, the latter can be interconnected.

A uniform and very exact keeping of the processing temperature is necessary with coating devices to process hot melting materials. To this effect, the housing block contains a heating chamber connected to heating lines and provided with a separating wall between the feed and discharge, the separating wall being fitted with an overflow border. Thus, first of all, one section of the heating chamber is filled with heating fluid, and the other section will follow only upon the overflowing of the heating means. If the stationary heating condition is reached and both chambers are filled, a constant overflow of the respective hottest amount of heating fluid beyond the separating wall will take place thus ensuring the required uniform distribution of temperature without expensive heating coils or heat distributors inside the housing block.

According to a preferred embodiment of the invention, a spindle system for adjusting the lip and another for turning the tube are arranged in an end wall of the housing block, the discharge and feed for the heating chamber being provided in the opposite end wall. The heat supply side and the drive side of the device are separated accordingly this way. This involves thermal and constructional advantages.

One preferred embodiment of the invention will be explained more closely hereinafter with reference to the enclosed drawings.

Figure 1:
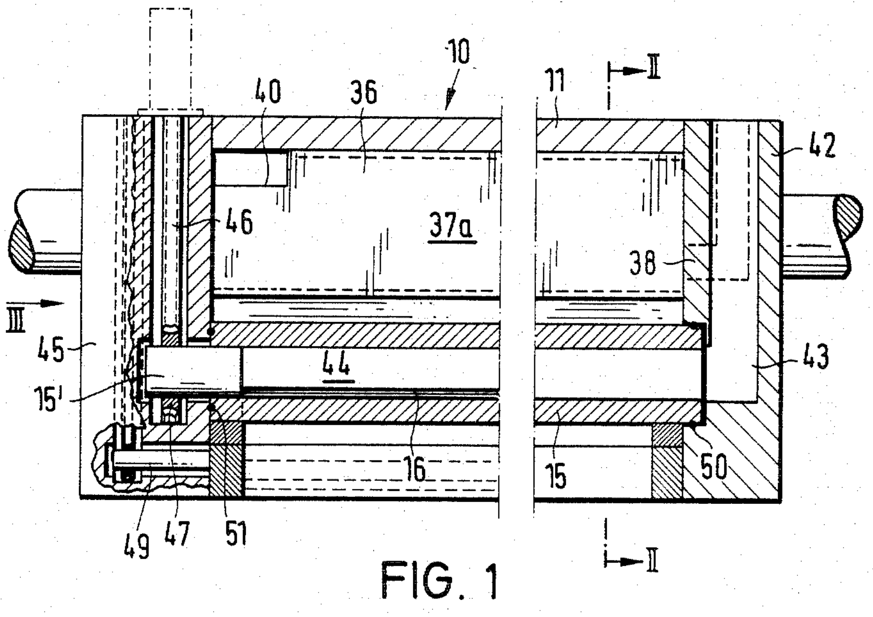
FIG. 1 is a part-sectioned plan view of the dosing device.

The illustrated dosing device comprises a housing block 10 of a first housing part 11 and a second housing part 12 fitted by screws to the underside of the first housing part 11. Both housing parts 11 and 12, placed against each other by surface-ground contact surfaces 13, are interconnected by screws 14. They have semicylindrical recesses which, when taken together, form a bore to receive a tube 15 that extends over the total length of the housing block and contains a longitudinal slot 16 formed radially from the internal tube surface to the external tube surface and over the total tube length. The outer surface of the tube 15 is contiguous to the semicylindrical surfaces of the housing parts 11 and 12, but by means of the spindle system explained hereinafter, the tube 15 can be rotated about its axis.

The semicylinder of the housing part 12 includes for the receipt of the lower tube half a gap 17 which also extends over the total length of tube 15 to run radially from the tube outside in downward direction. From the gap 17, a recess 18 outgoing to one side and provided also over the total tube length is so designed that its bottom approaches tangentially the outside of tube 15. Based on the latter, the circumferential extension of the recess 18 is about 30°. The recess 18 forms a gap limited downwardly by its bottom and upwardly by the outside of tube 15, the gap ending at right angles in gap 17 and its width, starting from gap 17 being reduced constantly to zero in anticlockwise direction. Upon rotation of the tube 15, the slotted outlet 16 gets into the range of recess 18. The length (peripheral extension) of recess 18 being a multiple of the width of the slotted outlet 16, a throttle point whose width is dictated by the respective rotary position of the tube 15 is formed between outlet 16 and recess 18.

Beneath the housing part 12, a stationary lip 20 is secured by screws 19 which extend through bores of the housing part 12 and which are screwed into thread bores 21 of the first housing part 11 that are designed as blind holes. In addition, at the lower housing part 12, a movable lip 22 is fitted which, together with the stationary lip 20, confines the vertical doctor gap 23 forming the continuation of gap 17. Lips 20 and 22 in common are forming the slit doctor die.

At its side averted from the doctor gap 23, the movable lip 22 is provided with a stem 22' forming with the remaining portion of lip 22 a gap into which protrudes the leg 25 of a wedge piece 26 extending obliquely relative to the doctor gap 23. In accordance with the inclination of the leg 25', the side 24 of the leg 22' facing the doctor gap 23 is chamfered just like wall 27 of lip 22 averted from the doctor gap 23. Thus, as evident from FIG. 4, walls 24 and 27 are parallel and extend at an angle of about 10° towards the doctor gap 23 while they include between them the legs 25 25 of the wedge piece 26.

The wedge piece 26 is designed as a carriage engaging a spindle 28 being continuous in longitudinal direction. On its side facing the doctor gap 23, the carriage is guided by the leg 25, and, at its opposite side, it is conducted by a recess 29 which engages a groove of a bracket 30 secured to the housing part 12 by means of screws 19'. The screws 31 also support a plate 30' which props the wedge piece 26 from below.

Figure 4:
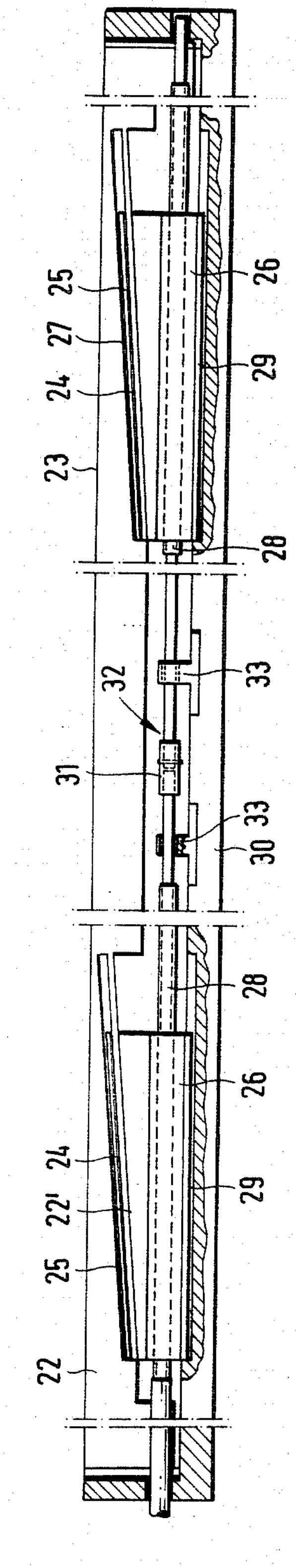
FIG. 4 is a basic illustration of the section along line IV—IV of FIG. 2.

As illustrated in FIG. 4, two wedge pieces 24 fitted consecutively over the length of the dosing device, comprise one spindle member 28 each which, at their facing ends are connected by a coupling element 31. Thus, the two spindle members in common form a spindle 32 continuous over its total length and whose ends are supported at the front ends of the housing block 10, while, in the central portion, they are supported bilaterally of the coupling element 31 in a threadless section in support bearings 33 at the bracket 30. Upon rotation of spindle 32, the two wedge pieces 26 are adjusted synchroneously in longitudinal direction, whereby the movable lip 12 is moved in transverse direction of the doctor gap 23. As a result, the gap width of the doctor gap 23 is changed.

Figure 2:
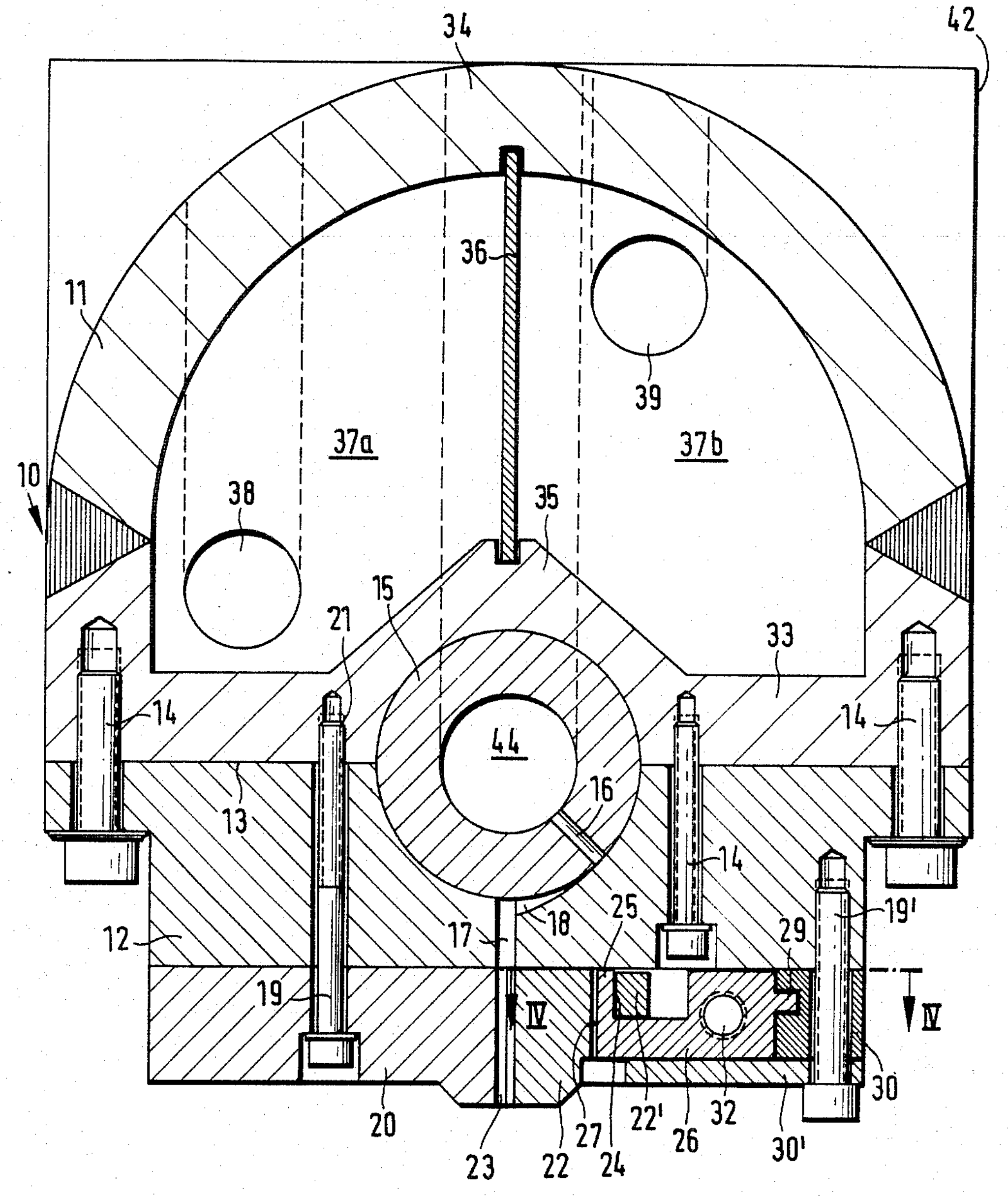
FIG. 2 is a scaled-up section along line II—II of FIG. 1.
Figure 3:
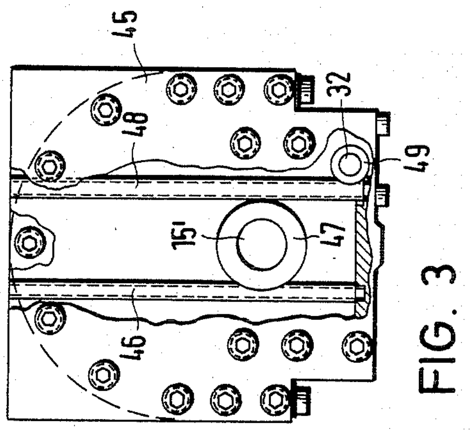
FIG. 3 is a part-sectioned front view of the dosing device in direction of arrow III of FIG. 1.

As shown in FIG. 2, the housing part 11 is an elongated hollow body comprising a bottom wall 33 and a nearly semicircular upper wall 34. Above the semicylindrical channel for tube 15, the bottom wall 33 is provided with a bulge 35 from which extends a vertical separating wall 36 to the apex of the upper wall 34 to subdivide, into two regions 37*a* and 37*b*, the heating chamber formed inside the housing part 11. From the one end side, feed line 38 ends in chamber 37*a*, while, from the same end side, discharge line 39 is conducted out of chamber 37*b*. A heated fluid, e.g. oil is flowing through lines 38 and 39 so as to keep the total housing block at a temperature as uniform as possible. The orifice point of line 38 is in the lower region of section 37*a* of the heating chamber, the orifice point of line 39 being in the upper region of section 37*b* of the heating chamber.

FIG. 1 shows that at the end averted from the openings 38 and 39, the separating wall 36 is provided in its upper area with an overflow border 40 past which the heating fluid will flow from section 37*a* into section 37*b* if a certain filling height is reached in section 37*a* of the heating chamber.

Lines 38 and 39 are inside an end wall 42 which closes one end of the housing block 10 and of the heating chamber 37*a*,37*b*.

Said front wall 42 also contains the feed channel 43 for the coating material. The end of the feed channel 42 is aligned with the inside of tube 15 which forms the distribution chamber 44. In other words, front wall 42 constitutes the supply side.

On the other hand, the drive side is formed by the opposite front wall 45 in which a spindle 46 to drive the tube 15 is supported in a bore extending transversely to tube 15 to the end of which an axle journal 15' is secured to wedge on it a worm wheel 47. Said worm wheel meshes with the thread of spindle 46 so that with the rotation of the outer end of spindle 46, the tube can be turned slowly and under control via the spindle drive 46,47 whereby the rotary position of slot 16 is changed.

In another bore of the end wall 45 extends a second spindle 48 in parallel to spindle 46. Said second spindle 48 meshes with a worm wheel 49 to drive spindle 32 so as to adjust the wedge pieces 26. By this means, the doctor gap can be changed by adjustment from the outside.

To prevent the heating fluid or the hot coating material from escaping out of the chambers and channels provided for said media, annular seals are fitted at the ends of tube 15, of which only the annular seal 50 is required for safety because the respective end of tube 15 is sealed anyhow by the axle journal 15 welded to it.

What is claimed is:

1. A dosing device for applying a flowable coating material to a support, said dosing device including a housing block and a feed line for supplying said coating material, said dosing device comprising:

an elongated distribution chamber within said housing block having a slit outlet and a doctor gap defined by two parallel lips arranged in flow direction behind said outlet, said distribution chamber comprising a tube rotatably mounted in a bore in said housing block, said feed line extending inward from the periphery of said housing block, said tube having a periphery substantially all of which is tightly enclosed by said housing block; and a recess formed in said housing block and extending over part of the circumference of said tube, radially enlarging in peripheral direction and opening into said doctor gap, further comprising adjusting means for changing the width of said doctor gap, said adjusting means including moving means for movably mounting at least one of said lips of said doctor gap in said housing block for movement relative to the other, wherein said moving means comprises at least one spindle system coupled to said at least one of said lips for selectively moving said at least one of said lips toward and away from the other of said lips, further comprising at least two wedge pieces, each having a wedge surface, and wherein said at least one of said lips has a wedge wall and said at least one spindle system comprises a spindle supported by said housing block and extending in parallel with said doctor gap, said spindle engaging said at least two wedge pieces and said wedge surfaces of said wedge pieces coacting with said wedge wall of said at least one of said lips.

2. A dosing device as claimed in claim 1, further comprising a member coupled to said housing block and having wedge-shaped recesses formed therein, said wedge-shaped recesses having a wedge angle corresponding to that of said wedge pieces, and wherein said wedge pieces are longitudinally displaceably mounted in said recesses at said at least one of said lips.

3. A dosing device as claimed in claim 1, wherein said spindle is divided into at least two spindle sections aligned axially with each other and firmly coupled to each other.

4. A dosing device as claimed in claim 1, further comprising a heating chamber formed in said housing block, heating lines opening into said heating chamber and including said feed line and a discharge line, and a separating wall in said heating chamber between said feed line and said discharge line, said separating wall having an overflow border.

5. A dosing device as claimed in claim 4, further comprising an additional spindle system coupled to said tube for rotating said tube, and wherein said housing block has spaced opposite first and second end walls, said at least one spindle system and said additional spindle system being mounted in said first end wall of said housing block and said feed and discharge lines being provided in said second end wall.

* * * * *